United States Patent Office 3,433,643
Patented Mar. 18, 1969

3,433,643
ACID FLAVORED VEGETABLE POWDER
Charles W. Tatter, Homewood, and Peter P. Noznick, Evanston, Ill., assignors to Beatrice Foods Co., Chicago, Ill., a corporation of Delaware
No Drawing. Filed July 12, 1965, Ser. No. 471,419
U.S. Cl. 99—59                                    12 Claims
Int. Cl. A23c 11/00, 13/02, 23/00

ABSTRACT OF THE DISCLOSURE

An acid flavored vegetable product is prepared by culturing with a sour cream organism an aqueous mixture of a vegetable fat and a calcium source.

This invention relates to an acid flavored vegetable powder.

It is an object of the present invention to prepare a vegetable fat product that is similar to sour cream.

Another object is to prepare a cultured acid flavored vegetable product that has a firm body.

Still further objects and the entire scope of applicability of the present invention will become apparent from the detailed description given hereinafter; it should be understood, however, that the detailed description and specific examples, while indicating preferred embodiments of the invention, are given by way of illustration only, since various changes and modifications within the spirit and scope of the invention will become apparent to those skilled in the art from this detailed description.

It has now been found that these objects can be attained by preparing a composition comprising water, a vegetable oil or fat, a caseinate, lactose, a soluble citrate, calcium carbonate and a phosphate buffer and culturing the mixture by inoculation with an appropriate sour cream culture. Preferably additional ingredients are present as indicated hereinafter.

Unless otherwise indicated all parts and percentages are by weight.

| Material | Preferred example (percent) | Range (percent) |
|---|---|---|
| 92° cocoanut oil | 18.0 | 12-26 |
| Mono and diglycerides (SGF 104) | 0.4 | 0.1-5 |
| Lecithin (Centralphil S.G.) | 0.1 | 0.05-5 |
| Guar gum | 0.2 | 0.01-1 |
| Sodium caseinate | 3.0 | 1-7 |
| Lactose | 4.5 | 2-8 |
| Citric acid hydrate | 0.3 | 0.05-1 |
| Calcium carbonate | 0.2 | 0.05-0.75 |
| Di potassium phosphate | 0.2 | 0.05-1 |
| Water | 73.1 | 55-80 |

EXAMPLE 1

Using the preferred example of materials set forth above all of the non-fat ingredients were mixed together and water was added thereto.

The fat and the mono and diglycerides were melted together and then the lecithin added. The fat mixture as then added to the water mixture and the product heated to 145° F. This mixture was next pasteurized in conventional fashion at 160-170° F. for 30 minutes, homogenized at 2000-2500 p.s.i. and cooled to 70° F.

The homogenzied mixture was cultured by inoculating with Klenzade No. 5 culture at a 3% level (liquid basis) and allowed to set at 70°±2° F. for 16 hours and then cooled to 40° F. The product was very good in body (similar in consistency to sour cream) and flavor and stood up for 10 days without breakdown. The product was useful as a dip.

EXAMPLE 2

The procedure of Example 1 was repeated but the homogenized inoculated mixture was allowed to set at 70±2° F. for 18 hours and was then pasteurized at 140-150° F. for 30 minutes homogenized at 1000-2000 p.s.i. and spray dried to give a powder suitable for packaging and use as a sour cream substitute.

If desired after obtaining the cultured product there can be added additional coating materials such as carbohydrate gums, e.g., gum arabic, or starch or milk solids non-fat or additional phosphate, e.g., sodium or potassium phosphate, dextrin and emulsifying agents.

The Klenzade No. 5 is a mixture of *Streptococcus lactis* and *Streptococcus cremoris*.

In place of this culture there can be used cultures of the other sour cream organisms alone or in admixture with each other. Such organisms include *Streptococcus cremoris*, *Streptococcus lactis*, *Streptococcus citrovorus*, *Streptococcus para citrovorus* and *Lactobacillus casei*. Commercial cultures of these types include Klenzade No. 3 and No. 9 and Chris Hansen's No. 12.

Calcium carbonate is the preferred source of calcium since it releases its calcium gradually and gives a product having a real firm body.

It is essential that the source of calcium be either in a form substantially insoluble in water or that it be present in an amount of not over 0.1% of the total solution weight and preferably buffered enough before innoculation with the bacteria such that the emulsion has a pH of at least 5.5 and preferably 6.0 to 7.5. Too high an initial free calcium source and/or too low an initial acidity has been found to retard the growth of the essential microorganisms. The calcium should be released slowly. Calcium lactate, calcium gluconate, calcium hydroxide, calcium chloride and tricalcium phosphate are examples of other calcium sources which can be employed in dilute solutions.

As the fat there can be used vegetable oils, including polyunsaturated oils, either hydrogenated or not, e.g., cocoanut oil, cottonseed oil, hydrogenated cottonseed oil, corn oil, hydrogenated corn oil, soybean oil, hydrogenated soybean oil, peanut oil, safflower oil, palm oil, hydrogenated palm oil, hydrogenated peanut oil. There can also be used animal fats such as hydrogenated lard or chicken fat.

As the emulsifier there is preferably employed a mixture of lecithin and mono and diglycerides although either can be used alone. The combination of emulsifiers gives better balance to the composition than either alone. The emulsifiers aid in stabilizing the product. The mono and diglycerides is a commercial product containing 40-42% mono, 43-45% diglycerides and the remainder triglycerides.

The guar gum is not essential, particularly for the spray dried product. However, it adds to the body of the liquid product and gives more firmness to the product. In place of guar gum there can be employed other bodying agents such as carboxymethyl cellulose, sodium alginate and potassium alginate, modified starches.

In place of sodium caseinate there can be used potassium caseinate, ammonium caseinate or soy proteins, such as sodium soy proteinate.

The citric acid hydrate is used to provide the acid medium. There can be employed anhydrous citric acid or sodium citrate. In place of citric acid other non-toxic acids can be used.

The dipotassium phosphate is a buffer. There also can be used disodium phosphate or diammonium phosphate in place thereof. Other buffers for the calcium are sodium citrate, sodium citrate-citric acid, sodium phosphate, sodium phosphate, phosphoric acid, dipotassium phosphate-mono potassium phosphate, ammonium citrate, dipotassium phosphate citric acid. The pH of the emulsion prior to inoculation with the sour cream culture organism should normally be 5.5 to 7.2 and is preferably on the acid side.

The solids content of the mixture is not critical but is usually 20–35% and preferably 25–30%.

EXAMPLE 3

| | Parts |
|---|---|
| 92° cocoanut oil | 18.0 |
| Mono and diglycerides | 0.4 |
| Lecithin | 0.1 |
| Sodium caseinate | 3.0 |
| Lactose | 4.5 |
| Sodium Alginate (Daroloid QH) | 0.2 |
| Sodium citrate | 0.3 |
| Di potassium phosphate | 0.2 |
| Calcium Lactate | 0.5 |
| Water | 72.8 |

The procedure of Example 1 was followed. The homogenized product exhibited very slight separation, had good body, was slightly curdy and had an excellent flavor.

As used in the claims the term vegetable fat is intended to be generic to vegetable fats and oils.

What is claimed is:

1. A process of preparing an acid flavored vegetable product as a sour cream substitute comprising mixing together a vegetable fat as the sole fat, an emulsifier, lactose, a water soluble nontoxic caseinate or soy protein, calcium carbonate, water and a buffer, adjusting the pH to a value between 5.5 and 7.2, adding a culture of a sour cream organism and culturing until there is obtained a product having the consistency of sour cream.

2. A process of preparing an acid flavored vegetable product as a sour cream substitute comprising mixing together a vegetable fat as the sole fat, an emulsifier, lactose, calcium carbonate, a soluble non-toxic caseinate, water and a buffer, adjusting the pH to a value between 5.5 and 7.2, adding a culture of a sour cream organism and culturing until there is obtained a product having the consistency of sour cream.

3. A process according to claim 2 including the further steps of pasteurizing, homogenizing and then spray drying the product.

4. A process according to claim 2 wherein there is included a bodying agent selected from the group consisting of guar gum, carboxymethyl cellulose and a non-toxic alginate.

5. A process according to claim 2 wherein the fat is coconut oil.

6. A process according to claim 2 wherein there is cultured an aqueous mixture containing 12–26 parts vegetable fat, 0.1–10 parts of an emulsifier selected from the group consisting of lecithin and mono and diglycerides, 1–7 parts of a water soluble non-toxic caseinate, 2–8 parts of lactose, 0.05–0.75 part calcium carbonate and 0.05–1 part of a phosphate buffer.

7. A process according to claim 6 wherein the mixture contains 0.05 to 1 part of a member of the group consisting of citric acid and water soluble non-toxic salts thereof.

8. A process of preparing an acid flavored vegetable product as a sour cream substitute comprising mixing together a vegetable fat as the sole fat, an emulsifier, lactose, a water soluble protein compound from the group consisting of a non-toxic caseinate and soy protein, water, a source of calcium selected from the group consisting of calcium carbonate, calcium lactate, calcium gluconate, calcium hydroxide, calcium chloride and tricalcium phosphate capable of supplying up to 0.1% of calcium in aqueous solution and a buffer in an amount to give a pH between 5.5 and 7.5, adding a culture of a sour cream organism and culturing until there is obtained a product having the consistency of sour cream.

9. A product prepared by the process of claim 8.

10. A product according to claim 9 wherein the protein compound is a non-toxic caseinate.

11. A product according to claim 9 wherein the calcium source is calcium carbonate.

12. A powder obtained by spray drying the product of claim 11.

References Cited

UNITED STATES PATENTS

| 3,391,002 | 7/1968 | Little | 99—54 |
| 3,397,994 | 8/1968 | Elenbogen et al. | 99—144 X |
| 3,359,116 | 12/1967 | Little | 99—54 |
| 1,216,052 | 2/1917 | Beckman et al. | 99—63 |
| 2,868,653 | 1/1959 | Diamond et al. | 99—63 X |
| 3,090,688 | 5/1963 | Woznick et al. | 99—63 X |
| 3,235,387 | 2/1966 | Stumbo et al. | 99—59 |

FOREIGN PATENTS

| 128,544 | 7/1920 | Great Britain. |
| 168,276 | 9/1921 | Great Britain. |

OTHER REFERENCES

"Processed Plant Protein Foodstuffs," edited by Altschul, 1958, Academic Press Inc., New York, pp. 408, 409.

LIONEL M. SHAPIRO, *Primary Examiner.*

D. M. NAFF, *Assistant Examiner.*

U.S. Cl. X.R.

99—63, 56, 64